United States Patent [19]

Kazumi

[11] Patent Number: 5,446,518
[45] Date of Patent: Aug. 29, 1995

[54] AUTOMATIC EXPOSURE CONTROL APPARATUS

[75] Inventor: Jiro Kazumi, Yokohama, Japan

[73] Assignee: Canon Kabushiki Kaisha, Tokyo, Japan

[21] Appl. No.: 192,797

[22] Filed: Feb. 7, 1994

Related U.S. Application Data

[63] Continuation of Ser. No. 914,538, Jul. 17, 1992, abandoned, which is a continuation of Ser. No. 530,190, May 29, 1990, Pat. No. 5,181,062.

[30] Foreign Application Priority Data

| May 29, 1989 | [JP] | Japan | 1-132769 |
| May 29, 1989 | [JP] | Japan | 1-132770 |
| Jun. 15, 1989 | [JP] | Japan | 1-153270 |

[51] Int. Cl.⁶ ............................ G03B 7/00; G06K 7/10
[52] U.S. Cl. .................................. 354/412; 235/375; 235/462; 235/472
[58] Field of Search ................. 354/412; 235/375, 462, 235/473, 472

[56] References Cited

U.S. PATENT DOCUMENTS

| 4,323,773 | 4/1982 | Carpenter | 235/473 |
| 4,423,319 | 12/1983 | Jacobsen | 235/472 |
| 4,465,926 | 8/1984 | Apitz et al. | 235/472 |
| 4,471,218 | 9/1984 | Culp | 235/472 |
| 4,629,304 | 12/1986 | Saegusa | 354/432 |
| 4,780,588 | 10/1988 | Edamura | 235/462 |
| 4,816,855 | 3/1989 | Kitaura et al. | |
| 4,853,733 | 8/1989 | Watanabe et al. | 354/412 |
| 4,899,370 | 2/1990 | Kameo et al. | 235/375 |
| 5,097,283 | 3/1992 | Kazumi | 354/412 |
| 5,181,062 | 1/1993 | Kazumi | 354/412 |

Primary Examiner—Russell E. Adams
Attorney, Agent, or Firm—Fitzpatrick, Cella, Harper & Scinto

[57] ABSTRACT

A camera capable of communicating with an information reading and transmitting apparatus comprises a detector for detecting a signal output from the information reading and transmitting apparatus, a memory prestoring therein a plurality of programs for effecting a plurality of camera operations, a selector for selecting a particular program from among the plurality of programs on the basis of the result detected by the detector, and a controller for controlling the camera operations on the basis of the particular program selected by the selector.

10 Claims, 21 Drawing Sheets

| BAR CODE | VALUE |
|---|---|
| 0 0 1 1 0 | 0 |
| 1 0 0 0 1 | 1 |
| 0 1 0 0 1 | 2 |
| 1 1 0 0 0 | 3 |
| 0 0 1 0 1 | 4 |
| 1 0 1 0 0 | 5 |
| 0 1 1 0 0 | |

| HEXADECIMAL | CONTROL |
|---|---|
| 0 0 H | F 2 |
| 0 1 H | F 2.8 |
| 0 2 H | F 4 |
| 0 3 H | F 5.6 |
| 0 4 H | F 8 |
| 0 5 H | F 11 |

OTHERS NO DATA

| FIG. 5A |
| FIG. 5B |

| | EV VALUE | CONTROL SEQUENCE |
|---|---|---|
| (1) NO DATA IN M1 | EV≦8<br>8<EV≦20<br>20<EV | AV=2, TV=EV−2<br>AV=2+1/2(EV−8), TV=6+1/2(EV−8)<br>TV=12, AV=EV−12 |
| (2) DATA IN M1 | EV≦8<br>8<EV≦8+M1<br>8+M1<EV=14+M1<br>14+M1<EV | AV=2, TV=EV−2<br>AV=2+(EV−8), TV=6<br>AV=2+M, TV=EV−AV<br>TV=12, AV=EV−12 |

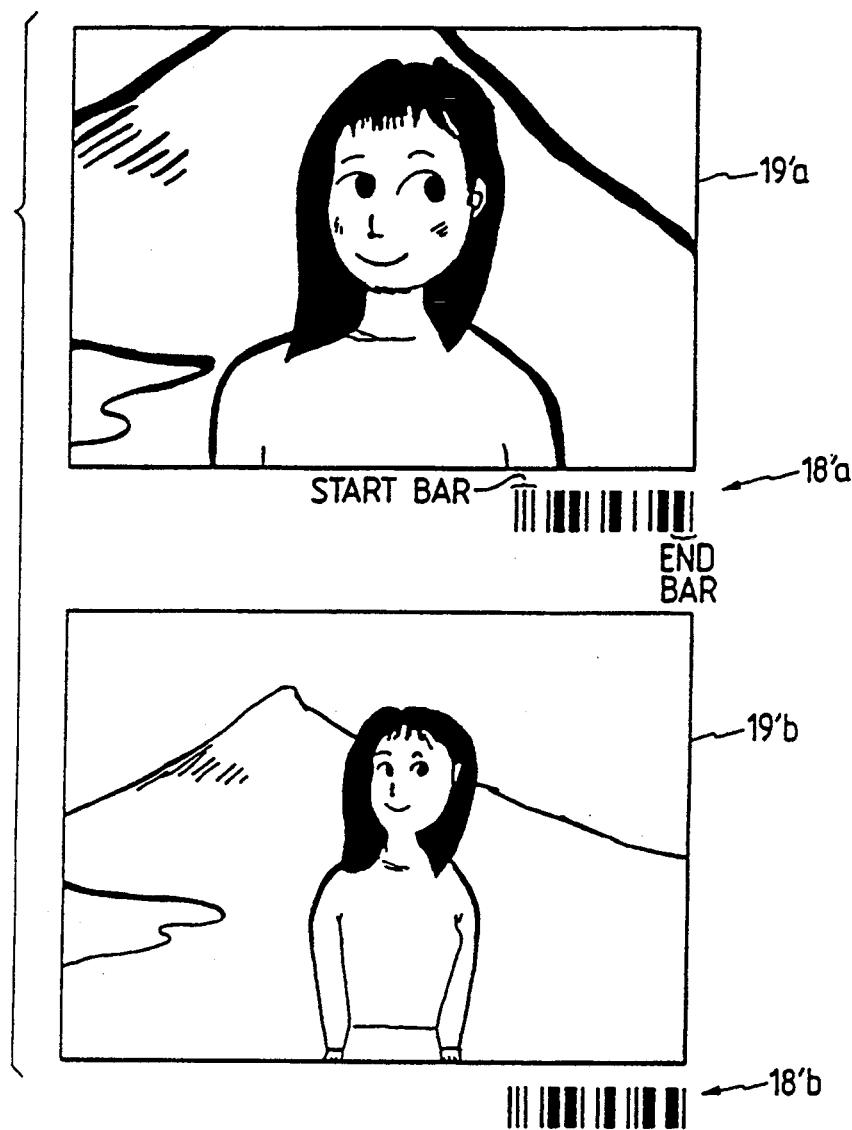

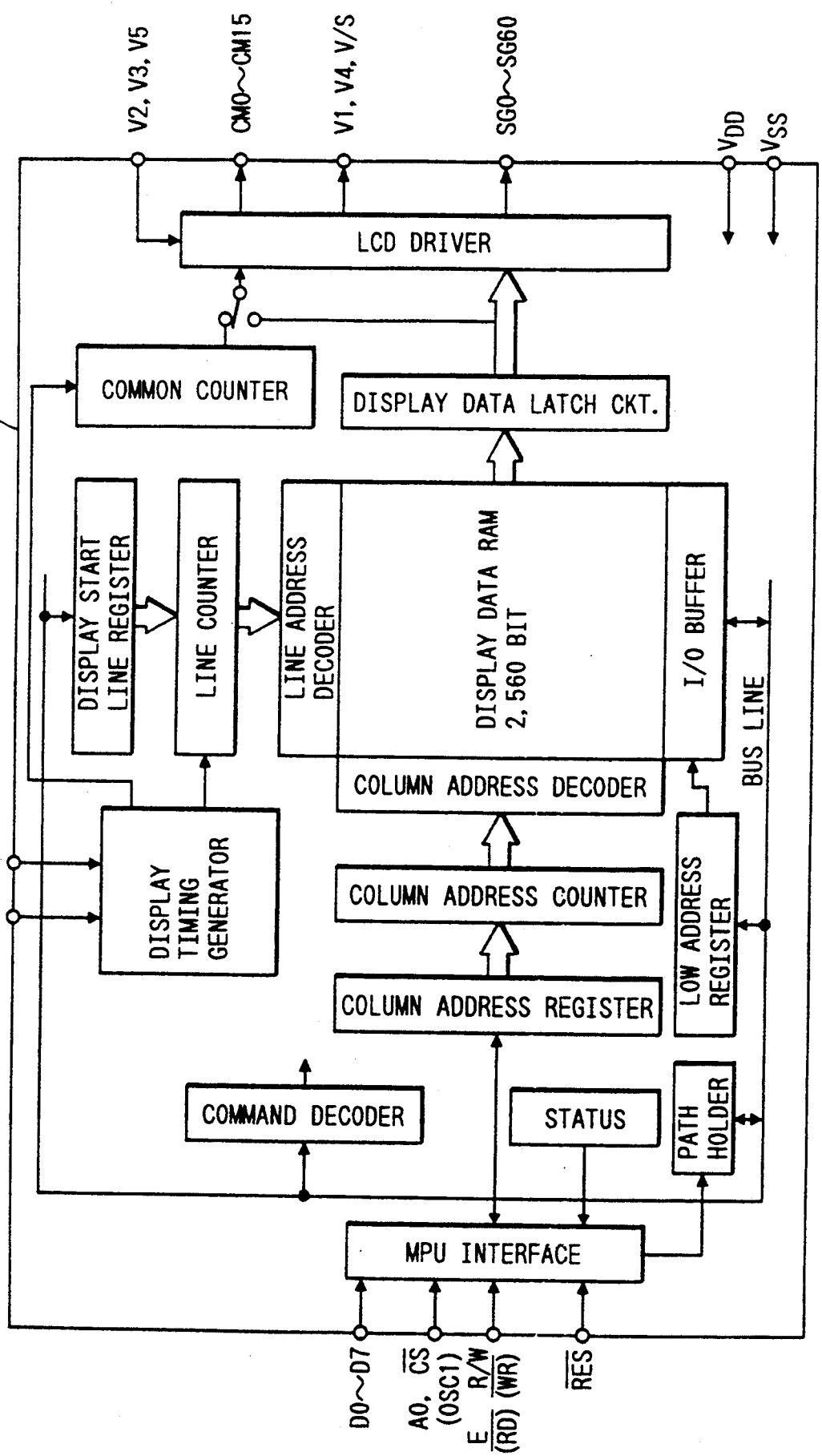

FIG. 14A (CORRESPONDENCE OF DISPLAY CODE AND CHARACTER)

| DECIMAL | HEXA-DECIMAL | CHARACTER | DECIMAL | HEXA-DECIMAL | CHARACTER | DECIMAL | HEXA-DECIMAL | CHARACTER |
|---|---|---|---|---|---|---|---|---|
| 32 | 20 | SPACE | 64 | 40 | @ | 96 | 60 | a |
| 33 | 21 | ! | 65 | 41 | A | 97 | 61 | b |
| 34 | 22 | " | 66 | 42 | B | 98 | 62 | c |
| 35 | 23 | # | 67 | 43 | C | 99 | 63 | d |
| 36 | 24 | $ | 68 | 44 | D | 100 | 64 | e |
| 37 | 25 | % | 69 | 45 | E | 101 | 65 | f |
| 38 | 26 | & | 70 | 46 | F | 102 | 66 | g |
| 39 | 27 | ' | 71 | 47 | G | 103 | 67 | h |
| 40 | 28 | ( | 72 | 48 | H | 104 | 68 | i |
| 41 | 29 | ) | 73 | 49 | I | 105 | 69 | j |
| 42 | 2A | * | 74 | 4A | J | 106 | 6A | k |
| 43 | 2B | + | 75 | 4B | K | 107 | 6B | l |
| 44 | 2C | , | 76 | 4C | L | 108 | 6C | l |
| 45 | 2D | - | 77 | 4D | M | 109 | 6D | m |

FROM FIG. 14A

| 46 | 2E | . | 78 | 4E | N | 110 | 6E | n |
| --- | --- | --- | --- | --- | --- | --- | --- | --- |
| 47 | 2F | / | 79 | 4F | O | 111 | 6F | o |
| 48 | 30 | 0 | 80 | 50 | P | 112 | 70 | p |
| 49 | 31 | 1 | 81 | 51 | Q | 113 | 71 | q |
| 50 | 32 | 2 | 82 | 52 | R | 114 | 72 | r |
| 51 | 33 | 3 | 83 | 53 | S | 115 | 73 | s |
| 52 | 34 | 4 | 84 | 54 | T | 116 | 74 | t |
| 53 | 35 | 5 | 85 | 55 | U | 117 | 75 | u |
| 54 | 36 | 6 | 86 | 56 | V | 118 | 76 | v |
| 55 | 37 | 7 | 87 | 57 | W | 119 | 77 | w |
| 56 | 38 | 8 | 88 | 58 | X | 120 | 78 | x |
| 57 | 39 | 9 | 89 | 59 | Y | 121 | 79 | y |
| 58 | 3A | : | 90 | 5A | Z | 122 | 7A | z |
| 59 | 3B | ; | 91 | 5B | [ | 123 | 7B | { |
| 60 | 3C | < | 92 | 5C | \ | 124 | 7C | | |
| 61 | 3D | = | 93 | 5D | ] | 125 | 7D | } |
| 62 | 3E | > | 94 | 5E | ^ | 126 | 7E | ~ |
| 63 | 3F | ? | 95 | 5F | _ | 127 | 7F | DEL |

FIG. 15

| D 7 6 5 4 3 2 1 0 | DATA | ADDRESS OFFSET (HEXA DECIMAL) | (DECIMAL) |
|---|---|---|---|
| 0 1 1 1 1 1 0 0 | 7C$_H$ | C6$_H$ | 198D |
| 0 0 0 1 0 0 1 0 | 12$_H$ | C7$_H$ | 199D |
| 0 0 0 1 0 0 0 1 | 11$_H$ | C8$_H$ | 200D |
| 0 0 0 1 0 0 1 0 | 12$_H$ | C9$_H$ | 201D |
| 0 1 1 1 1 1 0 0 | 7C$_H$ | CA$_H$ | 202D |
| 0 0 0 0 0 0 0 0 | 00$_H$ | CB$_H$ | 203D |
| 0 1 1 1 1 1 1 1 | 7F$_H$ | CC$_H$ | 204D |
| 0 1 0 0 1 0 0 1 | 49$_H$ | CD$_H$ | 205D |
| 0 1 0 0 1 0 0 1 | 49$_H$ | CE$_H$ | 206D |
| 0 1 0 0 1 0 0 1 | 49$_H$ | CF$_H$ | 207D |
| 0 0 1 1 0 1 1 0 | 36$_H$ | D0$_H$ | 208D |
| 0 0 0 0 0 0 0 0 | 00$_H$ | D1$_H$ | 209D |
| 0 0 1 1 1 1 1 0 | 3E$_H$ | D2$_H$ | 210D |
| 0 1 0 0 0 0 0 1 | 41$_H$ | D3$_H$ | 211D |
| 0 1 0 0 0 0 0 1 | 41$_H$ | D4$_H$ | 212D |
| 0 1 0 0 0 0 0 1 | 41$_H$ | D5$_H$ | 213D |
| 0 0 1 0 0 0 1 0 | 22$_H$ | D6$_H$ | 214D |
| 0 0 0 0 0 0 0 0 | 00$_H$ | D7$_H$ | 215D |

FIG. 16
FIG. 17
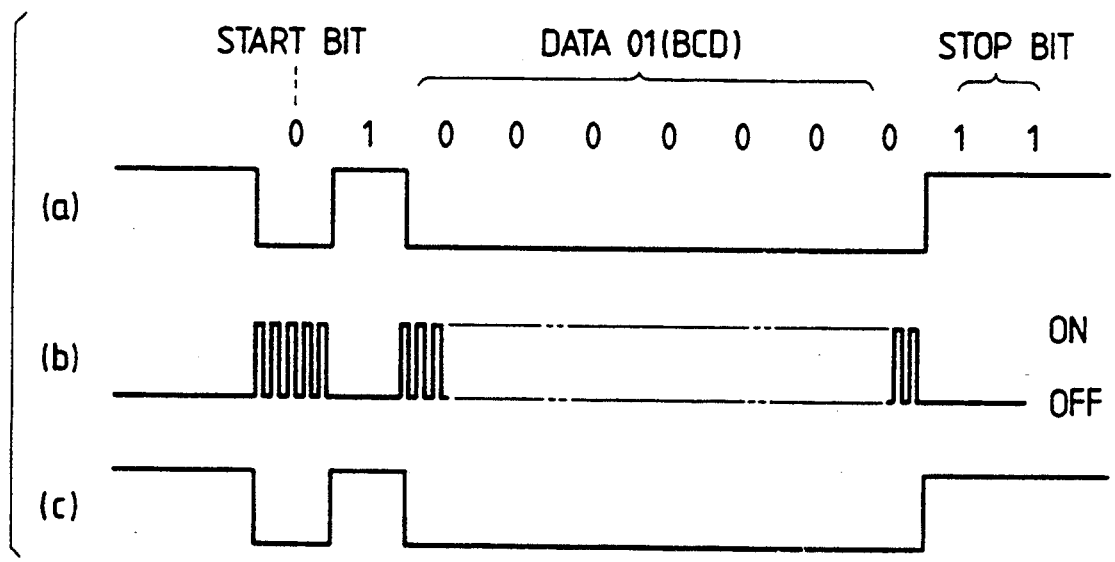
FIG. 18
| HEXADECIMAL | CONTROL |
|---|---|
| 00 H | F 2 |
| 01 H | F 2.8 |
| 02 H | F 4 |
| 03 H | F 5.6 |
| 04 H | F 8 |
| 05 H | F 11 |
OTHERS NO DATA

FIG. 19

| DATA | DISPLAY | CODE |
|---|---|---|
| $20_H$ | 20mm | $32_H$, $30_H$, $6D_H$, $6D_H$, |
| $21_H$ | 24mm | $32_H$, $34_H$, $6D_H$, $6D_H$, |
| $22_H$ | 28mm | $32_H$, $38_H$, $6D_H$, $6D_H$, |
| $23_H$ | 35mm | $33_H$, $35_H$, $6D_H$, $6D_H$, |
| $24_H$ | 50mm | $35_H$, $30_H$, $6D_H$, $6D_H$, |
| $25_H$ | 70mm | $37_H$, $30_H$, $6D_H$, $6D_H$, |
| $26_H$ | 100mm | $31_H$, $30_H$, $30_H$, $6D_H$, $6D_H$ |
| $27_H$ | 135mm | $31_H$, $33_H$, $35_H$, $6D_H$, $6D_H$ |
| $28_H$ | 200mm | $32_H$, $30_H$, $30_H$, $6D_H$, $6D_H$ |
| $29_H$ | 300mm | $33_H$, $30_H$, $30_H$, $6D_H$, $6D_H$ |

FIG. 20

| 100mm |
|---|

FIG. 21

| | EV VALUE | CONTROL SEQUENCE |
|---|---|---|
| (1) NO DATA IN M1 | $EV \leq 8$ | $AV=2$, $TV=EV-2$ |
| | $8 < EV \leq 20$ | $AV=2+1/2(EV-8)$, $TV=6+1/2(EV-8)$ |
| | $20 < EV$ | $TV=12$, $AV=EV-12$ |
| (2) DATA IN M1 | $EV \leq 8$ | $AV=2$, $TV=EV-2$ |
| | $8 < EV \leq 8+M1$ | $AV=2+(EV-8)$, $TV=6$ |
| | $8+M1 < EV = 14+M1$ | $AV=2+M$, $TV=EV-AV$ |
| | $14+M1 < EV$ | $TV=12$, $AV=EV-12$ |

28mm

TRIPOD

FIG. 27
| DATA | DISPLAY | CODE | | | | | | | | |
|---|---|---|---|---|---|---|---|---|---|---|
| $30_H$ | PORTRAIT | $50_H$, | $4F_H$, | $52_H$, | $54_H$, | $52_H$, | $41_H$, | $49_H$, | $54_H$, | $20_H$ |
| $31_H$ | SPORTS | $53_H$, | $50_H$, | $4F_H$, | $52_H$, | $54_H$, | $53_H$, | $20_H$, | $20_H$, | $20_H$ |
| $32_H$ | LANDSCAPE | $4C_H$, | $41_H$, | $4E_H$, | $44_H$, | $53_H$, | $43_H$, | $41_H$, | $50_H$, | $45_H$ |
| $33_H$ | CLOSE UP | $43_H$, | $4C_H$, | $4F_H$, | $53_H$, | $45_H$, | $20_H$, | $55_H$, | $50_H$, | $20_H$ |
FIG. 28
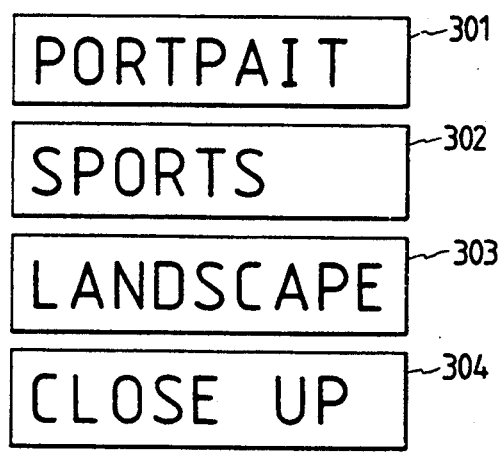
FIG. 29
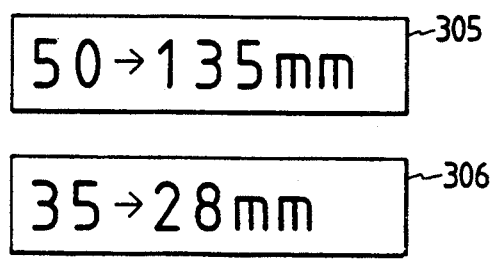

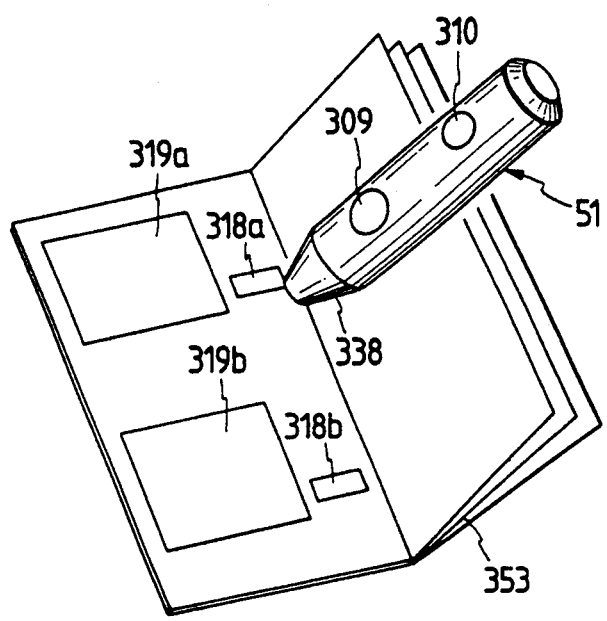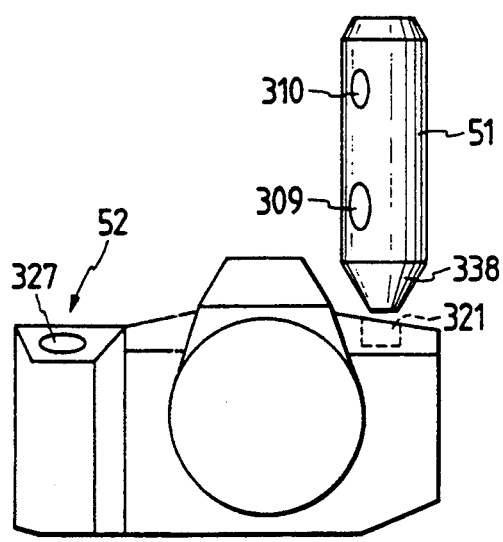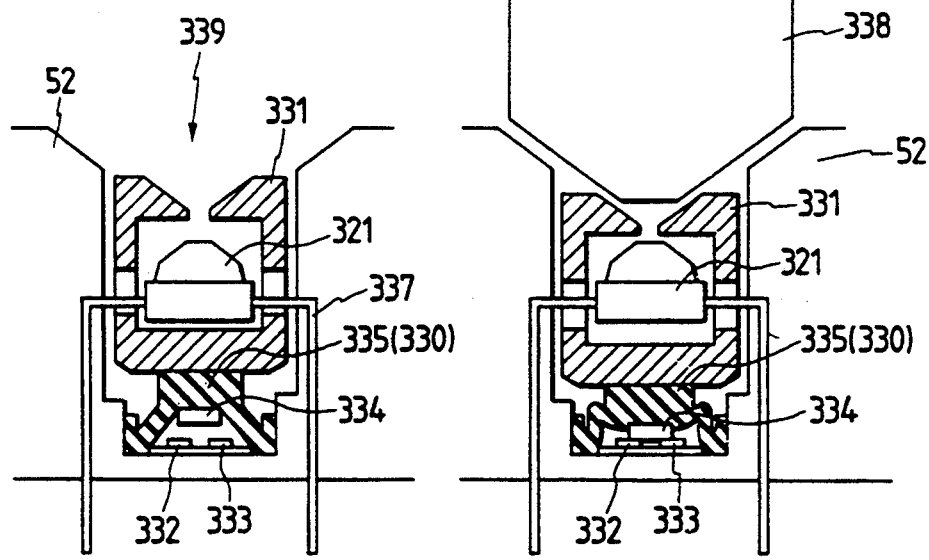

AUTOMATIC EXPOSURE CONTROL APPARATUS

This application is a continuation of application Ser. No. 07/914,538, filed Jul. 17, 1992, now abandoned, which is a continuation of application Ser. No. 07/530,190 filed May 29, 1990, which is now U.S. Pat. No. 5,181,062.

BACKGROUND OF THE INVENTION

1. Field of the Invention

This invention relates to a memory medium, an information reading apparatus for reading information from said memory medium, and a camera capable of exchanging signals with said information reading apparatus.

2. Related Background Art

Heretofore, in program AE, the values of shutter speed and aperture have corresponded to an EV value at one to one. However, depending on the purpose of photographing and the object to be photographed, it is sometimes more desirable to choose a particular shutter speed (or aperture value). For this reason, there have been proposed cameras having a plurality of program charts and used with the charts changed over (see, for example, U.S. Pat. No. 4,616,916, U.S. Pat. No. 4,536,074, U.S. Pat. No. 4,525,054, etc.).

However, depending on the purpose of photographing, it has sometimes been difficult to judge which chart should be chosen. For example, when the close-up of a flower is to be taken, if it is directed to the use as a record, it is more desirable to stop down the aperture as much as possible and make the depth of field deep, and if it is directed to the expression of the beauty of the flower, it is often more desirable to make the depth of field shallow. To judge this, it is necessary to know what effect the aperture gives a photograph. Also, the depth of field is greatly varied by a lens and therefore, it is also necessary to know the effect thereof.

Also, in the prior art, the provision of a variety of program charts has necessitated the provision of display means and input means for the change-over thereof, and this in turn has led to the problem that display and manipulation become more complex than in the case of a single program.

SUMMARY OF THE INVENTION

One aspect of this invention is the provision of a camera capable of exchanging signals with an information reading apparatus which readily enables any person having no knowledge of photography to accomplish adequate photographing.

BRIEF DESCRIPTION OF THE DRAWINGS

FIG. 10 illustrates examples of photographs by a second embodiment and code portions.

FIG. 11 shows the correspondence relation between bar codes and numerical values.

FIG. 12 is a block diagram showing an example of the construction of an LCD driver.

FIG. 14 shows the relation between display codes and characters in the MCU.

FIG. 15 shows a part of ROM of character data in the MCU.

FIG. 16 shows an example of the display on LCD.

FIG. 17 is a timing chart of a code transmitting unit and a code receiving unit.

FIG. 18 shows the correspondence relation between codes held in the MCU and program control.

FIG. 19 shows the correspondence between the display of data in the MCU and codes.

FIG. 20 shows another example of the display on the LCD.

FIG. 21 shows an example of the control of a program chart carried out by the MCU.

FIG. 27 shows the relation among codes, display and data in another embodiment of the present invention.

FIG. 28 shows examples of the display.

FIG. 29 shows examples of the display in still another embodiment of the present invention.

FIG. 31 is a perspective view showing an example of a bar code list and a code reading apparatus used to carry out the fourth embodiment.

FIG. 32 is a front view of the same code reading apparatus and a camera body.

FIGS. 33 and 34 are cross-sectional views of a power source switch and a transmitted signal reading portion which are the fourth embodiment.

DESCRIPTION OF THE PREFERRED EMBODIMENTS

Figure 1:
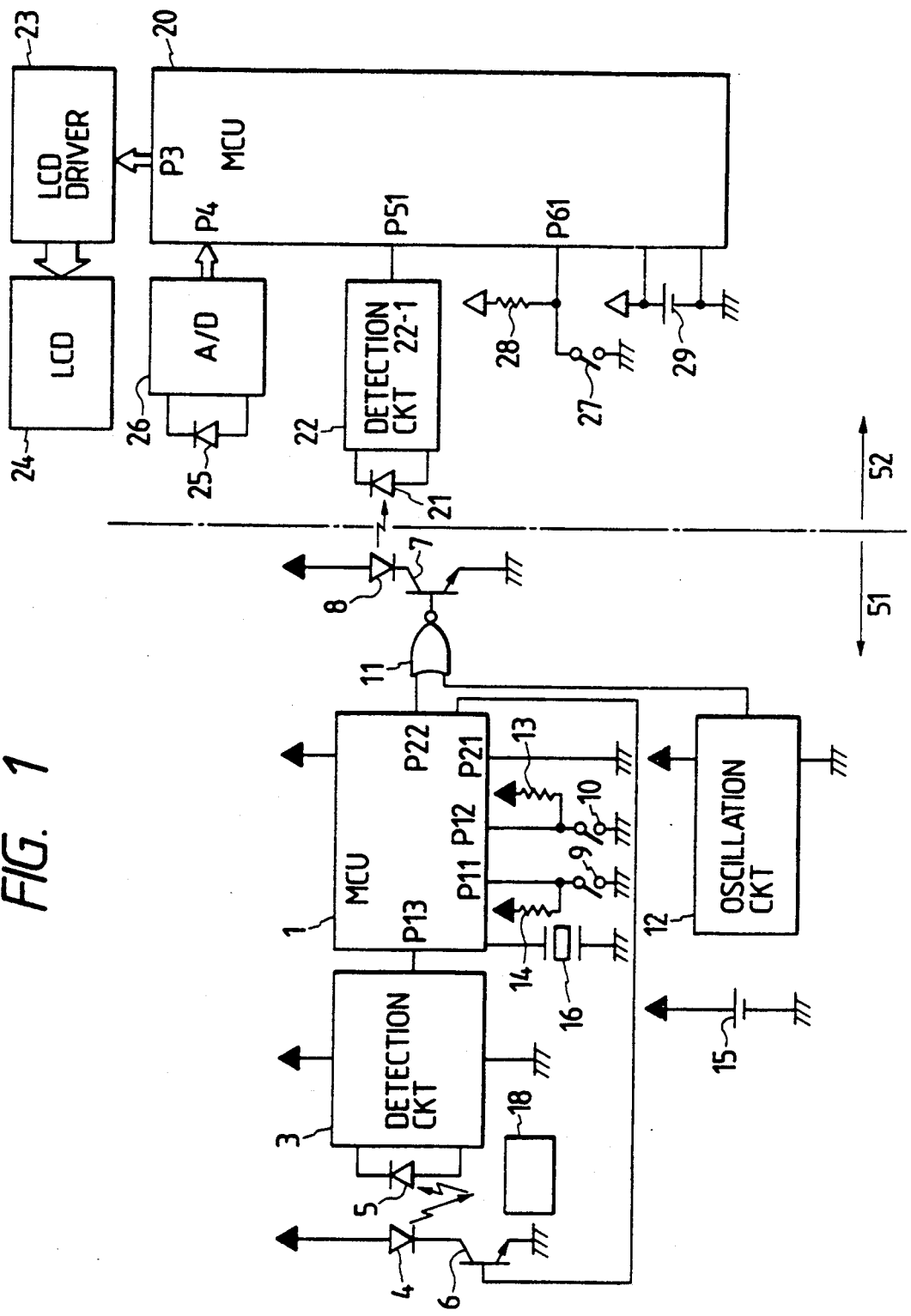
FIG. 1 is a block diagram showing a first embodiment of the present invention.

Referring to FIG. 1, which is a block diagram showing a first embodiment of the present invention, the reference numeral 51 designates a code reading apparatus and the reference numeral 52 denotes a camera body.

On the code reading apparatus 51 side, the reference numeral 1 designates a 1-chip microcomputer (hereinafter referred to as the MCU) which effects code reading control and which is comprised of a CPU, an ROM, an RAM, an IO, a serial communication interface (hereinafter referred to as SCI) and a timer. Of the IO of the MCU 1, an input port. P13 is connected to the output of a code detection circuit 3. Other input ports P11 and P12 are connected to switches 9 and 10, respectively, and these input ports are pulled up to a power source by resistors 13 and 14, respectively. The output port P21 of the IO of the MCU 1 is connected to the base of a transistor 6. The output port P22 of the SCI of the MCU 1 is connected to one input of a NOR circuit 11, and the other input of the NOR circuit 11 is connected to an oscillation circuit 12 of 38 KHZ, and the output thereof is connected to the base of a transistor 7. Thus, the output of the SCI is modulated at 38 KHZ and output. The collector of the transistor 6 is connected to an infrared light emitting diode (hereinafter abbreviated as iRED) 4. The reference numeral 5 designates a silicon photodiode (hereinafter referred to as the SPD) adapted to detect the reflected light from a code portion (hereinafter referred to as the bar code portion) 18 comprised of optically readable black bars and white spaces illuminated by a light emitted by LED 4. The detection circuit 3 detects the output of the SPD 5, and may output a low level if the detected output is a space of the bar code portion 18, and may output a high level if the detected output is a bar. The collector of the transistor 7 is connected to the iRED 8. The reference numeral 15 denotes a power supply battery for supplying a power source to the MCU 1, the detection circuit 3, the iRED 4 and iRED 8. The reference numeral 16 designates a buzzer for indicating that reading has been done accurately.

On the camera body 52 side, the reference numeral 20 denotes an MCU for effecting the control of the camera. The MCU 20, like the MCU 1, is comprised of a CPU, an ROM, an RAM, an IO and an SCI. The reference numeral 21 designates an SPD designed to receive infrared light emitted from the iRED 8. The SPD 21 is connected to a detection circuit 22, and is adapted to output a low-level signal from an output port 22-1 only when there is a signal modulated at 38 KHZ. The output port 22-1 is connected to the input port P51 of the SCI of the MCU 20. The reference numeral 25 denotes an SPD for measuring the luminance of an object to be photographed. The SPD 25 is connected to an A/D converter 26, which converts the luminance of the object to be photographed into a digital value and outputs it to P4 which is the input port of the IO of the MCU 20. The input port P4 is constructed of 8 bits. The reference numeral 24 designates a display LCD, and the reference numeral 23 denotes a driver for driving the LCD 24. The driver 23 is connected to the output port P3 of the IO of the MCU 20. The input port P61 of the IO of the MCU 20 is connected to a switch 27 and is pulled up to a power source by a resistor 28. The reference numeral 29 designates the power supply battery of the camera 52 side which supplies a power source to the MPU 20, the LCD driver 23, the A/D converter 26 and the detection circuit 22.

The SCI of the MCU 1 is adapted to output a non-synchronous type signal of 8 character length bits, 2 stop bits and 1 start bit, and the SCI of the MCU 20 is adapted to receive the signal as an input.

Figure 2:
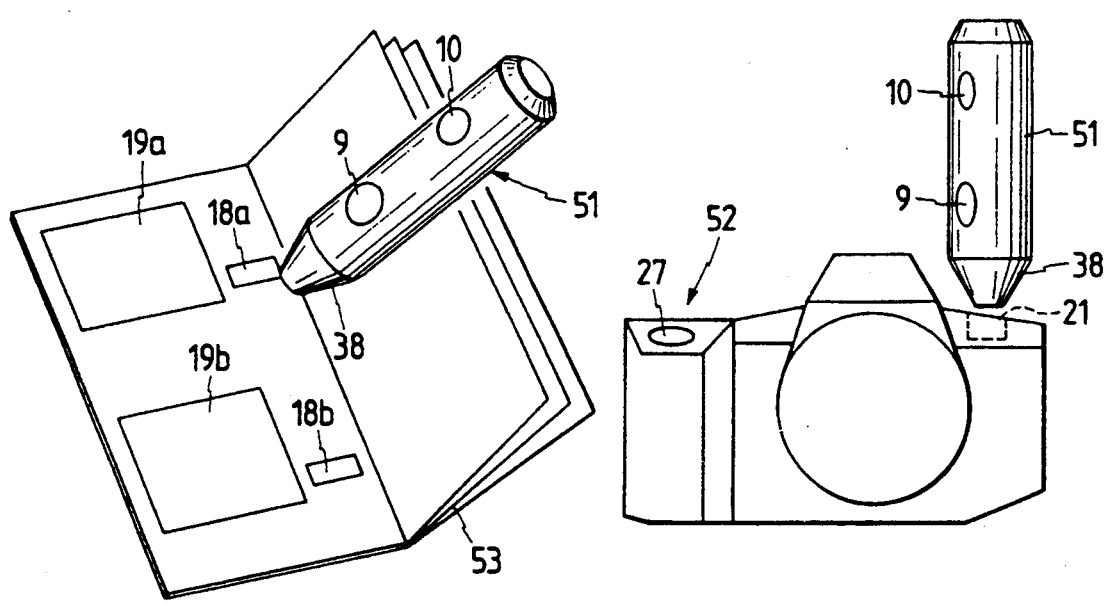
FIG. 2 is a perspective view of a bar code list and a code reading apparatus and a front view of a camera.

FIG. 2 is an appearance view of the code reading apparatus 51, the camera body 52 and a bar code list 53, and in this figure, members identical to those in FIG. 1 are given identical reference numerals.

The code reading apparatus 51 is provided with two switches 9 and 10, and the iRED 4 and SPD 5 which provide a code reading portion are incorporated in one half of the apparatus and a data transmitting iRED 8 is incorporated in the other half of the apparatus.

The camera body 52 is provided with a switch 27 for effecting photometry and a data receiving SPD 21.

The bar code list 53 has printed thereon bar code portions 18a and 18b corresponding to aperture information and examples of photographs 19a and 19b corresponding thereto, and the bar code portions 18 may be traced by a code reading portion to thereby effect the reading of bar codes.

The format of the bar code portions 18 will now be described.

The bar code of the bar code portions 18 is comprised of a thin line (which is called the narrow bar), a thick line (which is called the wide bar), a narrow spacing between the bars (which is called the narrow space) and a wide spacing between the bars (which is called the wide space), and "0" is made to correspond to the narrow bar and the narrow space, and "1" is made to correspond to the wide bar and the wide space. The ratio of width between the narrow space and the narrow bar is 1:1, and the ratio of width between the narrow bar and the wide bar is 1:3. The bar code portions 18 (18a, 18b) are shown in FIG. 3.

Figure 3:
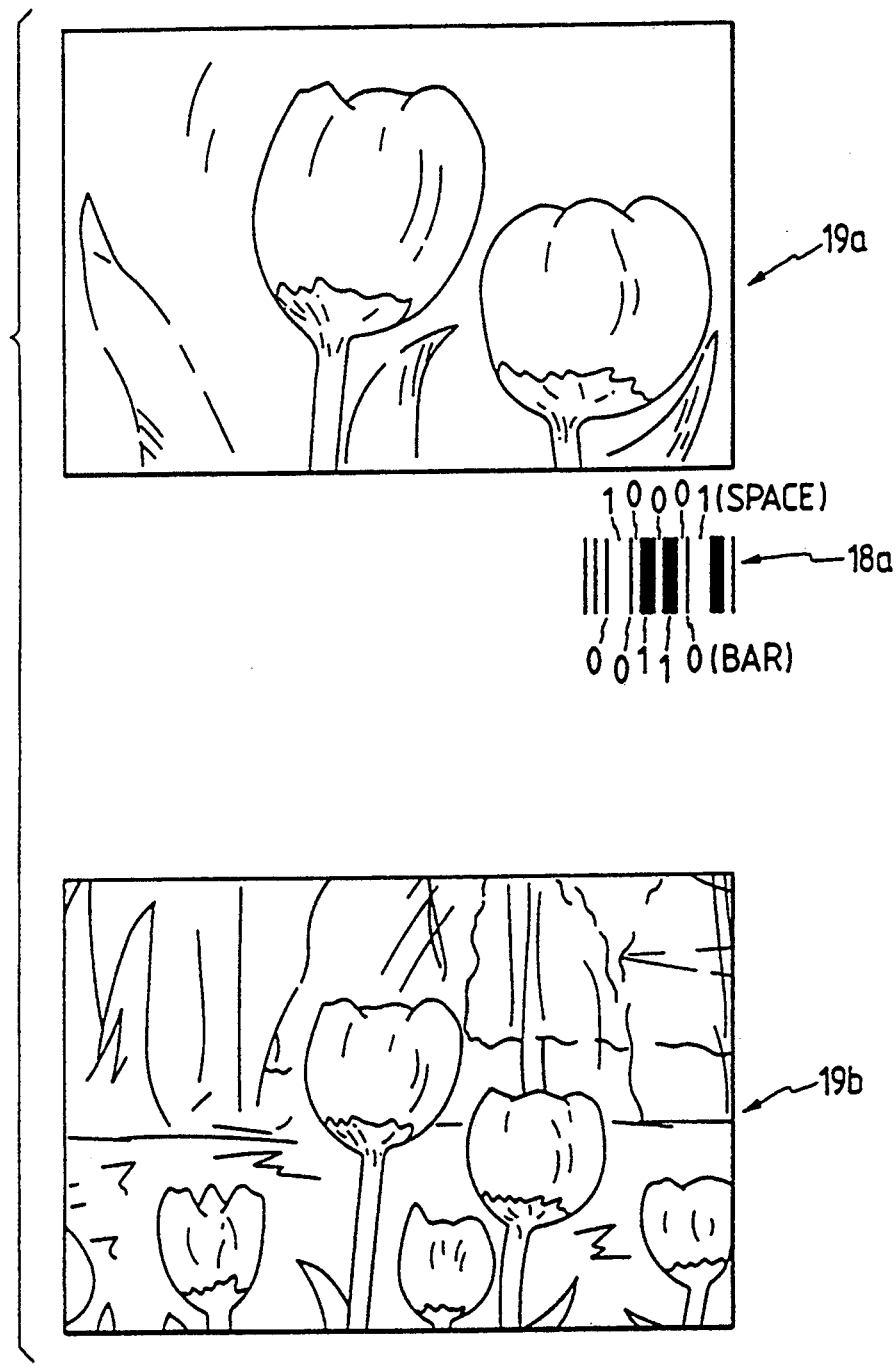
FIG. 3 illustrates examples of photograph and bar code portions.
Figures 4, 6, 7:
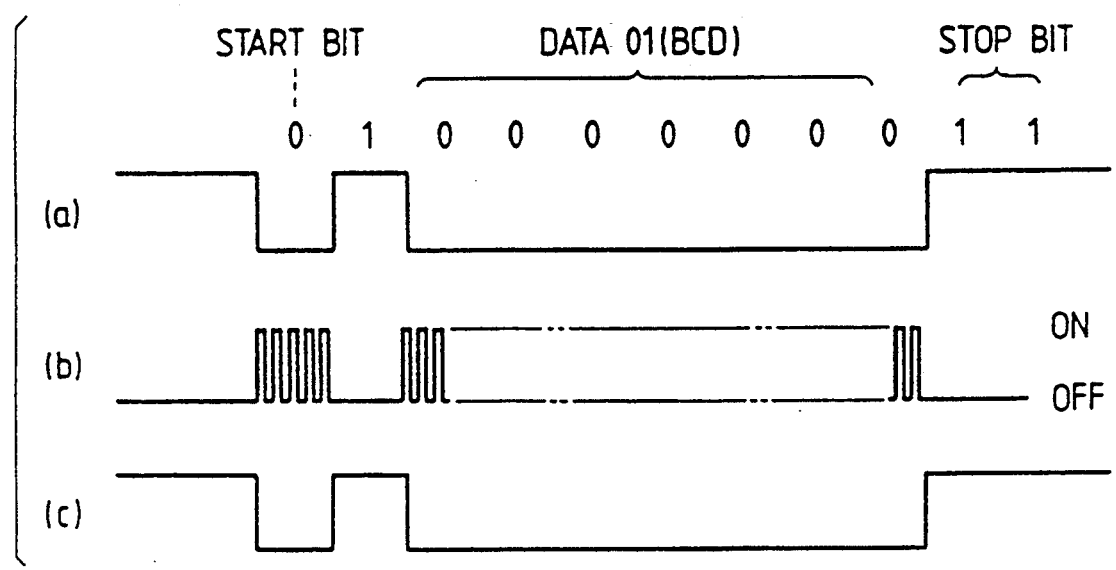
FIG. 4 shows the correspondence between bar codes held in MCU 1 shown in FIG. 1 and numerical values.
FIG. 6 is a timing chart of a code transmitting unit and a code receiving unit.
FIG. 7 shows the correspondence relation between codes held in MCU 20 shown in FIG. 1 and program control.

As shown in FIG. 3, the bar code always starts with a combination of two narrow bars and a narrow space (which is called the start bar), and ends with a narrow space (which is called the end bar) interposed between a wide bar and a narrow bar. Data is written between the start bar and the end bar, and this data is written with five bars and five spaces corresponding thereto as a unit, and it is to be understood that each of them expresses a one-figure number. The arrangement order of "0" and "1" and the relation between the numbers represented thereby are shown in FIG. 4.

For example, in the bar code portion 18a shown in FIG. 3, "00110" is indicated by bars with the start bar followed by "0" as the narrow bars and "1" as the wide bars, and likewise in the space, "10001" is displayed. Accordingly, it is seen from FIG. 4 that the bar code portion 18a of FIG. 3 is a (decimal) bar code indicative of "01" and likewise, the bar code portion 18b of FIG. 3 is a bar code indicative of "04".

The bar code reading operation will now be described with reference to the flow chart of FIG. 5.

As previously described, when the output of the detection circuit 3, i.e., the input to the input terminal P13 of the MCU 1, is at a high level, the bar code portions 18 are in the state of bar, and when said output is at a low level, the bar code portions 18 are in the state of space.

Six registers T0, T1, T2, n, D1 and D2 are prepared in the RAM in the MCU 1.

First, at a step 100, it is waited for the first bar to be found out, and at steps 101–103, the time of the first narrow bar is measured, and at steps 104 to 106, the time of the narrow space is measured, and at steps 107 to 109, the time of the next narrow bar is measured, and 1.5 times as great as the maximum value of them is used as a time T0 to be used to determine narrow or wide.

When the measurement of the time T0 by the start bar is terminated, at a step 121, a data register is cleared and the reading of data is started.

At steps 123 and 124, the time of the bar is read, and if it is greater than the time T0, it is judged to be "1", and the data is doubled and "1" is added thereto. If otherwise, the data is only doubled. At steps 128 and 129, the time of the space is read, and if it is greater than the time T0, it is likewise judged to be "1", and a similar operation is performed.

Each time a set of bar and space is read, the register n is incremented and the reading of a bar and a space is repeated.

At steps 150 and 151, the overflow of the timer is detected. If there is an overflow, it is judged that the reading of the bars has been terminated. If at the step 150, there occurs an overflow, it is judged as an error, and again, operation from (a), i.e., the step 100, is performed. If at the step 151, there occurs an overflow, at a step 152, whether the termination is normal is first checked up by the number of the bars, and then at steps 153 and 154, the end bar is checked up, and if it is NG (not a normal termination), it is judged as an error and again, the operation from (a) is performed.

If the above-described check-up is all right, at steps 155 and 156, the portion corresponding to the data of the end bar, which portion is a binary expression of the data indicated by the bar code, may be eliminated and converted in accordance with FIG. 4, whereby the data of the bar code may be obtained. If at this time, the corresponding data is not on the table as shown in FIG. 4, it is also judged as an error and again, the operation from (a) is performed and reading is effected again. Also, when the reading could be done, the buzzer 16 is driven to effect an indication to that effect.

Description will now be made of the operation when in the above-described construction, it is desired to express flowers beautifully.

The photograph 19a of FIG. 3 is an example of photograph when it is desired to express flowers beautifully, and the photograph 19b of FIG. 3 is an example of photograph when it is desired to record flowers. In the former, the aperture is selected to F4 and the depth of field is made shallow to blur the background, whereby the beauty of the flowers is expressed, and in the latter, the aperture is selected to F16 and the depth of field is made deep, whereby there is provided a photograph in which the background can be identified to a certain degree and the situation of photographing can be seen well.

In this case, the expression of flowers is the main purpose and thus, the photograph 19a is selected, that is, the reading of the bar code portion 18a corresponding to the photograph 19a is effected. To effect the reading of data, the bar code portion 18a is traced while the switch 9 is depressed. When the switch 9 is depressed, the MCU 1 renders the output terminal P21 into a high level and renders the transistor 6 conductive and therefore, the iRED 4 is turned on. At the same time, the MCU 1 effects the reading (already described) of the bar code portion 18a. Here, "01" by decimal is expressed in the bar code portion 18a and therefore, the value thereof is read in.

When the switch 10 is then depressed, the MCU 1 outputs from the SCI (output port P22) binary data "00000001" resulting from "01" having been converted into BCD code.

The waveform thereof is shown in FIG. 6(a). This output is modulated into 38 KHZ by the NOR circuit 11, and turns on the transistor 7 by a waveform as shown in FIG. 6(b), thereby turning on the iRED 8. The infrared light emitted from the iRED 8 is detected by the SPD 21 disposed in the camera 52, is demodulated by the detection circuit 22, becomes the same signal as that of FIG. 6(a) as shown in FIG. 6(c) and is input to the SCI of the MCU 20. Thus, the MCU 20 has received data "00000001" (binary), i.e., hexadecimal data "01" indicative of F4 (see FIG. 7).

The MCU 20 stores this data "01" in a part M1 of the RAM contained therein.

Here, when the switch 27 is depressed, the MCU 20 measures the luminance of the object to be photographed from the output of the A/D converter 26, and effects a calculation for determining the shutter speed (TV value) and the aperture value (AV value). As regards the output of the A/D converter, it is to be understood that the EV value can be intactly read at the input port P4.

Figures 8, 9:
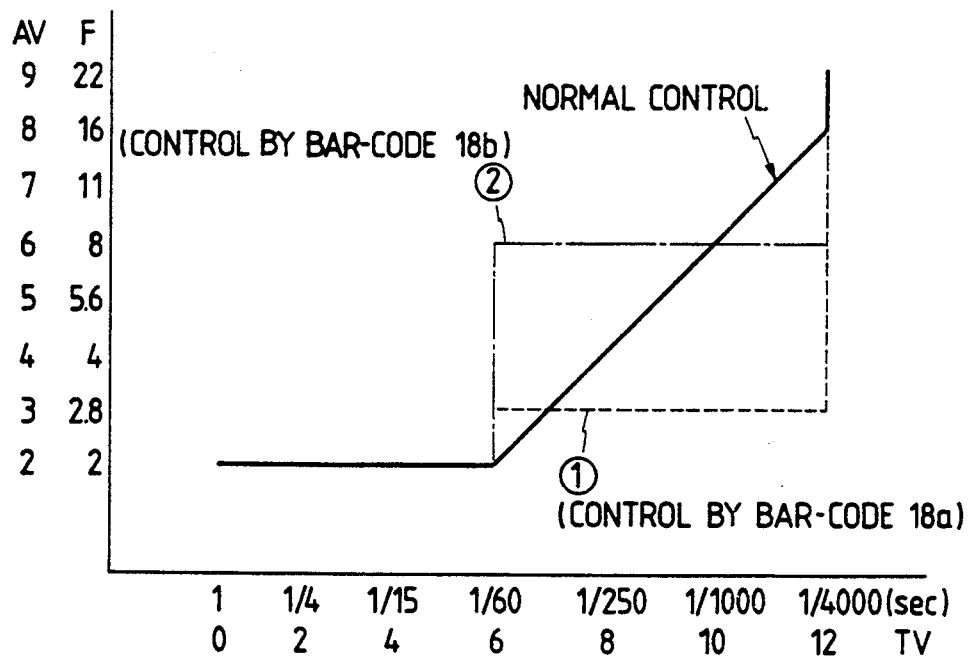
FIG. 8 shows an example of the control of a program chart carried out by the MCU 20 shown in FIG. 1.
FIG. 9 shows that program chart.

When the value of the aforementioned M1 is "06" or greater (the data of M1 being undefined), the MCU 20 effects the normal control shown in FIG. 8(1), and when the value of M1 is other than that, the MCU 20 effects the control shown in FIG. 8(2).

Since the value of M1 is "01" now, the MCU 20 effects the control of FIG. 8(2). That is, for an EV value of "8" or less, the control is the aperture priority AE of an aperture F2, and for an EV value of "8" to "9", the control is the shutter speed priority AE of a shutter speed 1/60 sec., and for an EV value of "9" to "15", the control is the aperture priority AE of an aperture F2.8, and for an EV value of "15" or greater, the control is the shutter speed priority AE of a shutter speed 1/4000 sec. This program chart is shown in FIG. 9(1). Accordingly, in the range of brightness of EV9 to EV15 (almost all cases of photographing in the daytime being included in this range of brightness), photographing is effected at an aperture F2.8 and such a photograph as previously described (the photograph 19a) with the background blurred can be taken.

Conversely, when it is desired to take a photograph from which the situation of photographing can be well seen, if the bar code portion 18b is traced by the reading portion, the control as shown in FIG. 9(2) will be effected in a similar manner.

According to the present embodiment, a code corresponding to an example of a photograph at one to one and representative of aperture data suitable for that photograph is prepared and this code is read so as to control the program chart of the camera and therefore, even if one does not know how the aperture and the shutter speed will act on a photograph, one can simply choose a photograph in which the best use is made of those effects, thereby reflecting those effects on a photograph to be taken. Also, the infrared light input portion is the only member on the camera body 52 side that is necessary to carry out these and therefore, on the part of the camera side, there is no necessity of increasing the display and operating members, and there is also the effect that the operability particularly when the effects of the aperture and shutter speed need not be taken into consideration can be made simple.

Also, these photographs and codes can be duplicated in a great quantity as by printing and the cost thereof can be correspondingly reduced.

Further, these photographs also provide materials for teaching what expressions can be done by the use of such camera system and therefore, can also be used for that purpose.

(Modifications)

In the present embodiment, the transmission of data from the code reading apparatus 51 to the camera body 52 is done by infrared rays, but alternatively, it may be done by the wire system with the ports P22 and P51 directly connected together. In such case, the operability of reading will be spoiled by the wire system, but the power sources, etc. can be made common and thus, the cost can be reduced. Also, the aperture value is changed by the data of the bar code portions 18, but alternatively, the shutter speed may be changed. Further, the information of the bar code portions 18 is not limited to the aperture information and the shutter speed information, but may also be the information used for the control effected prior to the photographing operation (the exposure operation, for example), the lens focal length information or the like.

Also, in the present embodiment, bar codes are used as what represents the aperture information corresponding to an example of a photograph, whereas the present invention is not restricted thereto, but any code may be used if it can correspond to a photograph at one to one and can be easily converted into an electrical signal. For example, use may be made of coded data written on a magnetic card recently used widely and having photographs printed on the surface thereof.

Also, photographs (or printed matters) have been shown as an example, but anything which could be visually perceived by the photographer will do.

For example, if the images of examples of photographs are recorded as the images on a video tape and data similar to that of the above-described embodiment which has been modulated at a particular frequency is recorded on the sound portion of the video tape and the code reading apparatus 51 is changed from the SPD to a microphone and the detection circuit 3 is made to correspond thereto, similar photographing can be accomplished by operating the reading apparatus 51 in the portion of an image to be photographed while watching the video tape by means of a video deck.

As described above, according to the present embodiment, there are provided detecting means for detecting a code signal from an information reading apparatus for detecting selected information, memory means prestoring therein a plurality of programs for effecting a plurality of camera operations, selecting means for selecting a program for effecting a particular camera operation, and control means for progressing the camera operation on the basis of said selected program, whereby a program for effecting the camera operation necessary to take an intended photograph, such as a program chart or lens focal length information corresponding to the code signal from the information reading apparatus is automatically set and therefore, any person having no knowledge of photography can accomplish adequate photographing easily.

A second embodiment of the present invention will now be described.

The block diagram of the second embodiment is common to FIG. 1 and therefore is not shown. The appearances of the code reading apparatus 51 and camera body 52 are also common to FIG. 2.

On a bar code list 53, as shown in FIG. 10, there are printed photographs 19'a and 19'b corresponding to bar code portions 18'a and 18'b, respectively, and the bar code portions 18' may be traced by a code reading unit to thereby accomplish the reading of bar codes.

It is to be understood that as shown in FIG. 10, the bar code always starts with a combination (called the start bar) of two narrow bars and a narrow space and ends with a narrow space (called the end bar) interposed between a wide bar and a narrow bar. Data is written between the start bar and the end bar, and this is written with five bars and five spaces corresponding thereto as a unit, and it is to be understood that each of them expresses a one-figure number. The relation between the arrangement order of "0" and "1" and the numbers represented thereby is shown in FIG. 11.

For example, on the bar code portion 18'a shown in FIG. 10, subsequently to the start bar, "00110" and "01001" are indicated by bars with the narrow bars as "0" and the wide bars as "1", and likewise in the space, "10001" and "01001" are indicated. Accordingly, it is seen from FIG. 11 that the bar code portion 18'a of FIG. 10 is a (decimal) bar code indicative of "01" and "26" and likewise, the bar code portion 18'b of FIG. 10 is a bar code indicative of "04" and "22".

Figures 5, 5A:
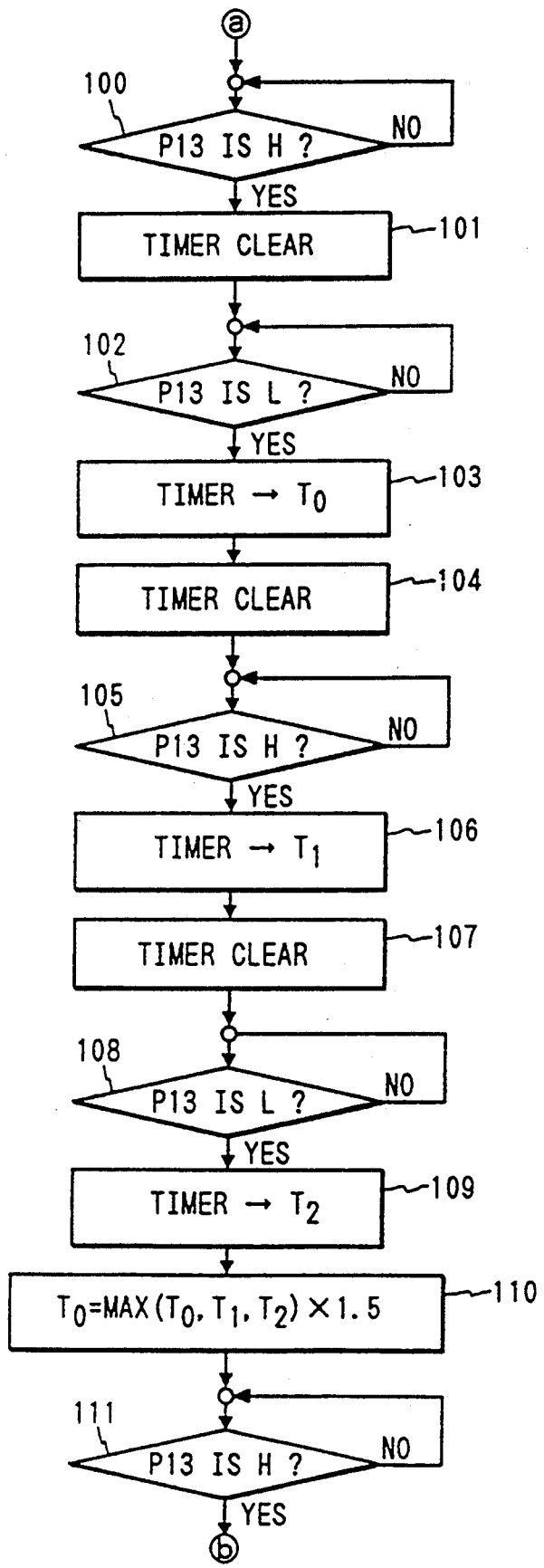
FIG. 5 is a flow chart showing the operation of the code reading apparatus of the first embodiment of the present invention.
Figure 5B:
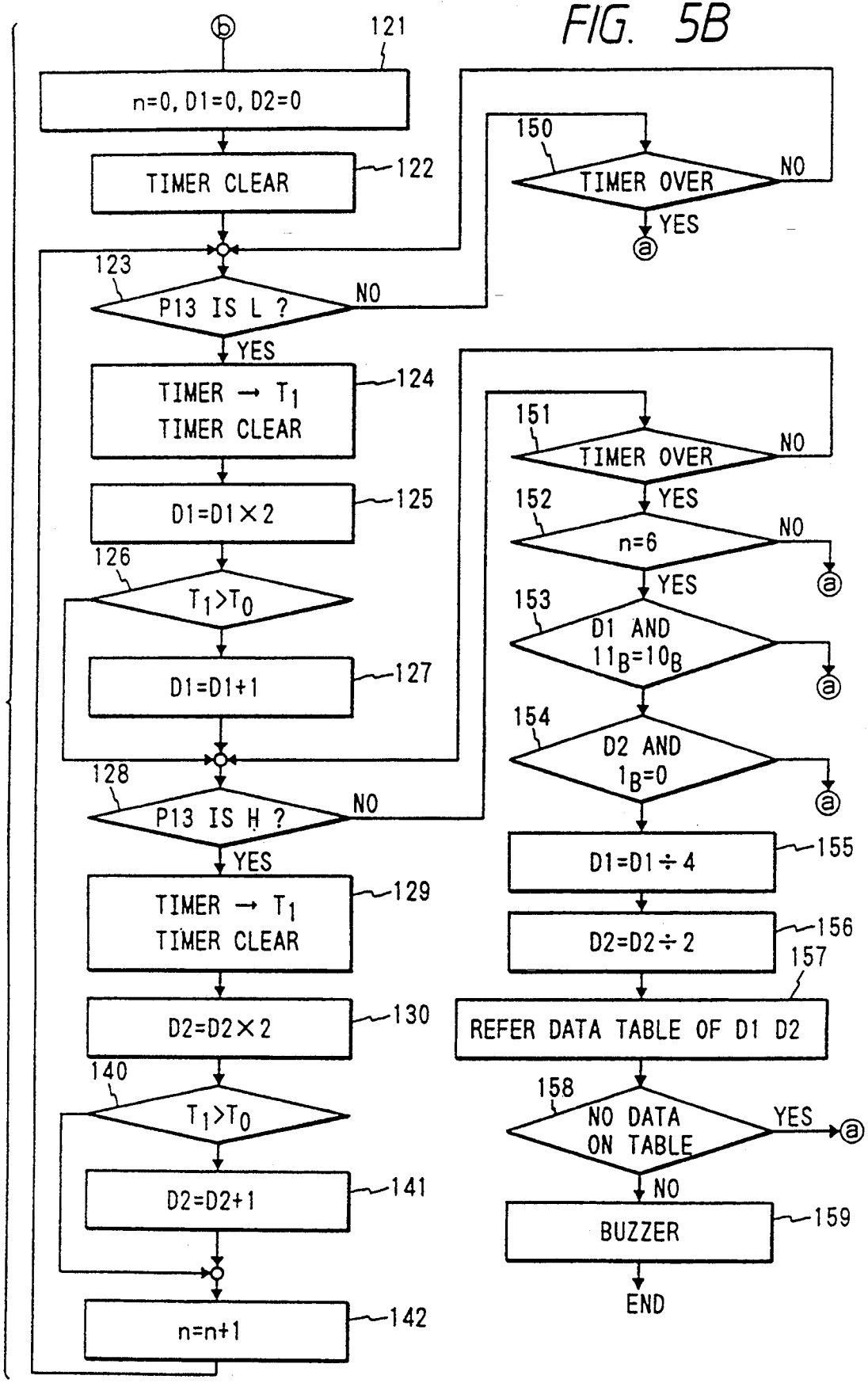

The flow of the bar code reading operation is common to FIG. 5.

FIG. 12 is a block diagram of a dot matrix LCD driver 23 (see FIG. 1) (this figure is a block diagram of SED1520F produced by Seiko Epson Co., Ltd. and description will hereinafter be made of a case where said SED1520F is used).

The present IC has an RAM for display data, and 1 bit of the RAM corresponds to 1 pixel of LCD display, and design is made such that when "1" is written into 1 bit of the RAM, the pixel thereof is turned on and when "0" is written into 1 bit of the RAM, the pixel thereof is turned off. To write data into the RAM for display data, when data is written in from 8-bit data buses DO–D7, that data may be written into the RAM and at the same time, a column address counter is automatically incremented by "+1", and when writing-in is then effected from the data buses, writing may be effected into an area in the RAM which neighbors the area into which writing has been effected last.

Description will now be made of the operation of the MCU 20 when display is effected on the LCD 24 (see FIG. 1) through such an LCD driver 23.

Figure 13:
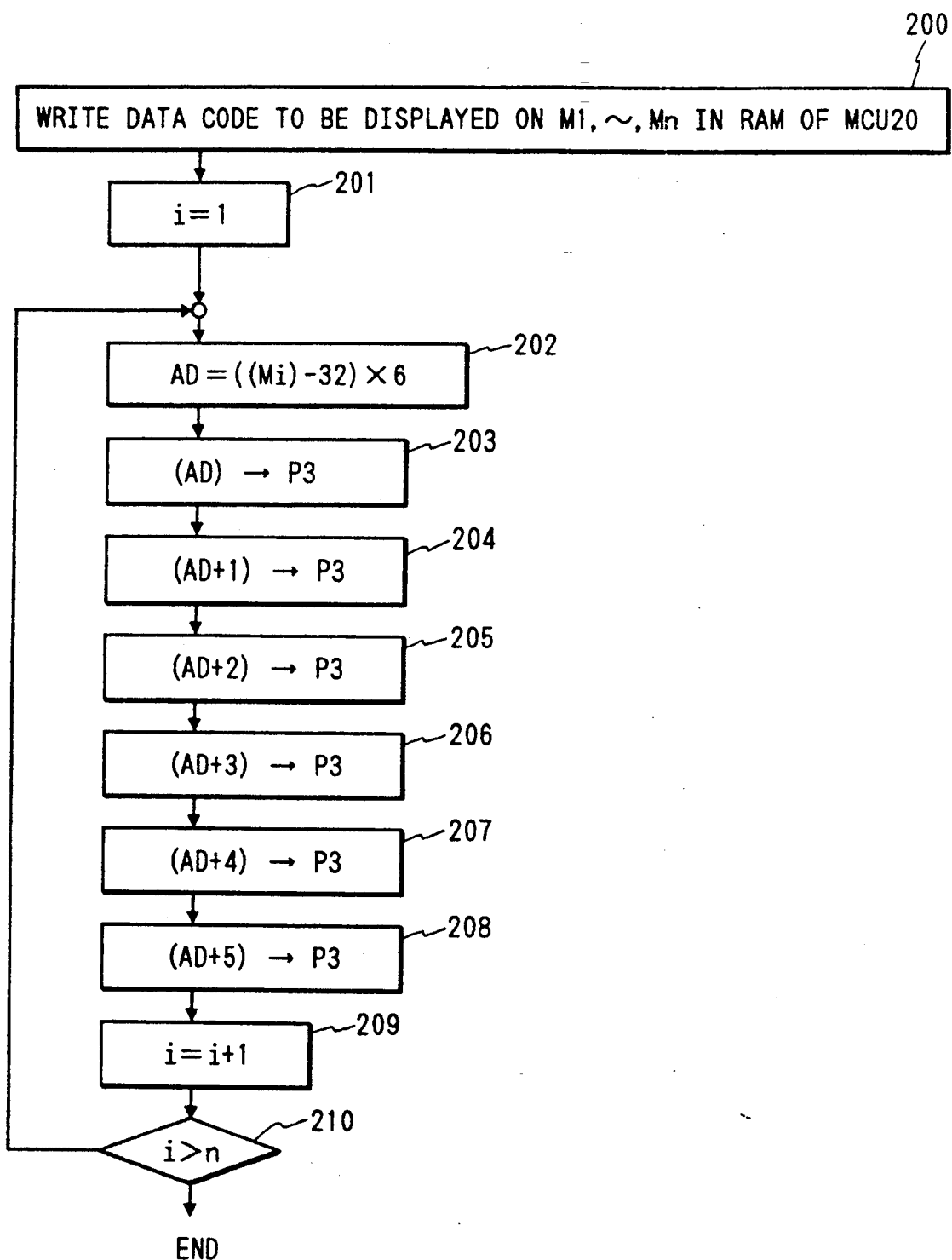
FIG. 13 is a flow chart showing the operation regarding the display of the MCU.

FIG. 13 is a flow chart when data is written into the LCD driver 23. First at a step 200, the codes of characters to be displayed are written in the order of display into display areas M1, M2 . . . , Mn (it is to be understood that n characters are displayed) on the RAM in the MCU 20. Here, as regards the codes, it is to be understood that as shown in FIG. 14, data of 1 byte represents one character. On the other hand, in a portion of the ROM in the MCU 20, there is written a bit image comprised of vertical 8 bits×horizontal 6 bits corresponding to each character code, as shown in FIG. 15. Here, the address offset value is the offset value from the head of these data.

For example, when the display of "ABC" is to be effected, hexadecimal codes 41H, 42H and 43H are written into the display areas M1, M2 and M3, respectively. Here, the MCU 20 first writes a bit image corresponding to the content "41H" of M1 in the manner of the equation shown in a step 202. The address "C6H" of the ROM is found, and the data "7CH" of that address is output from the port P3 of the MCU 20. Thereafter, the data of "C6H" onward are output by 6 bytes in succession from the port P3.

That is, hexadecimal data 7CH, 12H, 11H, 12H, 7CH and 00H in the portion encircled by a dotted line in FIG. 15 are successively output from the port P3 to the LCD driver 23. These data are then written into the display data RAM in the LCD driver 23. Accordingly, the character "A" is first displayed on the LCD 24. Likewise, finally "ABC" is displayed on the LCD 24 as shown in FIG. 16.

Description will now be made of the operation when in the above-described construction, a person is photographed.

A photograph 19'a shown in FIG. 10 is a photograph in which a person's face is chiefly aimed at by a lens of focal length 100 mm, and a photograph 19'b also shown in FIG. 10 is a photograph taken close to a person by a wide angle lens of 28 mm with the background also photographed, and description will herein be made of a case where a photograph chiefly of a person, like the photograph 19'a, is taken.

The photograph 19'a is selected from the bar code list 53, and in order to read the code portion 18'a corresponding thereto, the code portion 18'a is traced while the switch 9 is depressed. When the switch 9 is depressed, the MCU 1 of the code reading apparatus 51 renders the port P21 into a high level and renders the transistor 6 conductive and therefore, the iRED 4 is turned on. At the same time, the MCU 1 performs the bar code reading operation (previously described). Since the code portion 18'a is expressive of "01" and "26" (decimal), the values thereof are read in.

When the switch 10 is then depressed, the MCU 1 outputs from the SCL data "00000001B" and "00100110B" obtained by "01" and "26" having been converted into BCD codes at each two columns.

FIG. 17(a) shows the waveform when "00000001B" is being transmitted. This data is modulated into 38 KHZ by the NOR circuit 11, renders the transistor 7 conductive by the waveform as shown in FIG. 17(b), and turns on the iRED 8. The infrared light emitted from this iRED 8 is detected by the SPD 21, is demodulated by the detection circuit 22, becomes the same signal as the signal of FIG. 17(a) as shown in FIG. 17(c) and is transmitted to the MCU 20. Thus, the MCU 20 has received data "00000001B" and "00100110B" (binary), i.e., hexadecimal data "01H" (which is aperture control information as shown in FIG. 18) and data "26H" (which is information indicative the lens focal length information 100 mm shown in FIG. 19).

The MCU 20 stores the first data "01H" in a portion C1 of the RAM contained therein and stores the second data "26H" in a portion D1 differing from the portion C1. In accordance with the code table of FIG. 19, the MCU 20 writes data into the display RAM areas M1-M$_n$ by the value of D1. Since D1 is "26H", the MCU 20 writes in M1=31H, A2=30H, M3=30H, M4=6DH and M5=6DH, and displays data which is the lens focal length information on the LCD 24 as shown in FIG. 20, in accordance with the contents thereof. Thus, the photographer looks at this display, thereby performing the operation of interchanging the presently used interchangeable lens with an interchangeable lens capable of setting "100 mm" if the focal length of the presently used interchangeable lens is e.g. "35-75 mm".

When the switch 27 is then depressed, the MCU 20 measures the luminance of the object to be photographed from the output of the A/D converter 26, and effects a calculation for determining the shutter speed (TV value) and the aperture value (AV value). It is to be understood that the output of the A/D converter 26 is such that the EV value can be read at the input port P4 as it is.

When the value of the aforementioned M1 is "06" (see FIG. 18) or greater (the data of M1 being undefined), the MCU 20 effects the control shown in FIG. 21(1), and when the value of M1 is other than that, the MCU 20 effects the control shown in FIG. 21(2).

Figures 22, 23:
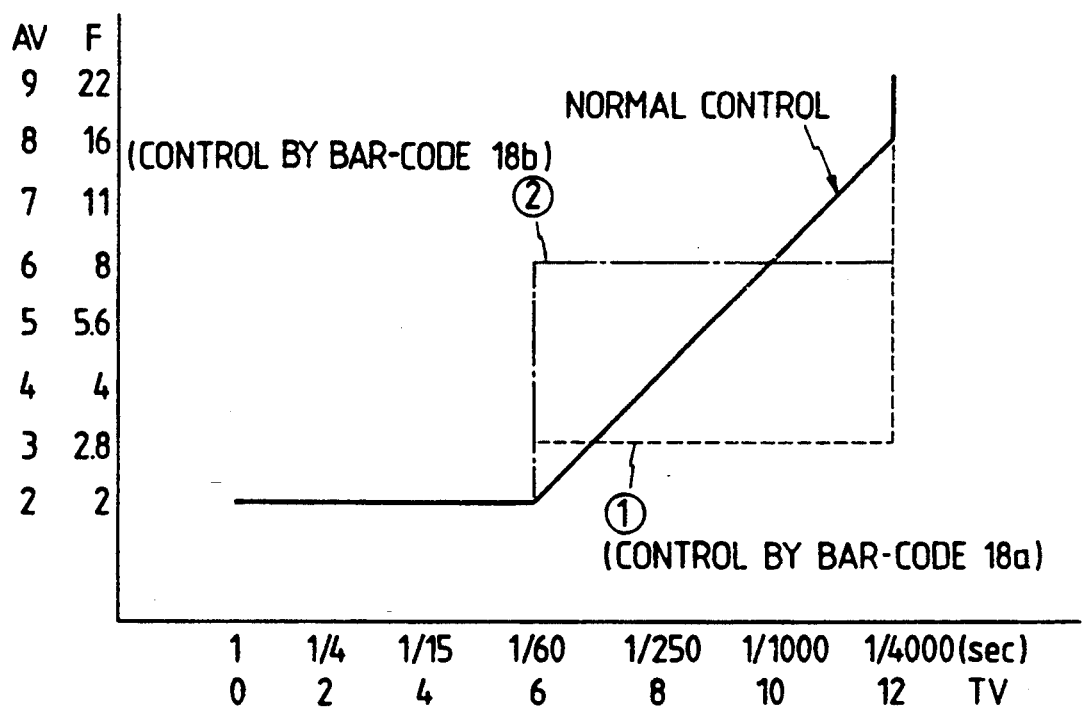
FIG. 22 shows that program chart.
FIG. 23 shows another example of the display on the LCD.

Since the value of M1 is "01" now, the MCU 20 effects the control of FIG. 20(2). That is, for an EV value of "8" or less, the control is the aperture priority AE of an aperture F2, and for an EV value of "8" to "9", the control is the shutter speed priority AE of a shutter speed 1/60 sec., and for an EV value of "9" to "15", the control is the aperture priority AE of an aperture F2.8, and for an EV value of "15" or greater, the control is the shutter speed priority AE of a shutter speed 1/4000 sec. This program chart is shown in FIG. 22(1). Accordingly, in the range of brightness of EV9 to EV15 (almost all cases of photographing in the daytime being included in this range of brightness), photographing is effected at an aperture F2.8 and such a photograph as previously described (the photograph 19'a) with the background blurred can be taken.

Accordingly, a program chart best suited for a photograph like the photograph 19'a in which the chief object is a person is automatically selected and the focal length "100 mm" of the lens best suited for photographing is displayed on the LCD 24 (see FIG. 20).

When the photograph 19'b is selected and the bar code 18'b is traced, the focal length "28 mm" shown in FIG. 23 is displayed on the LCD 24. Thus, the photographer can know the lens focal length information necessary for the intended photographing.

Figure 24:
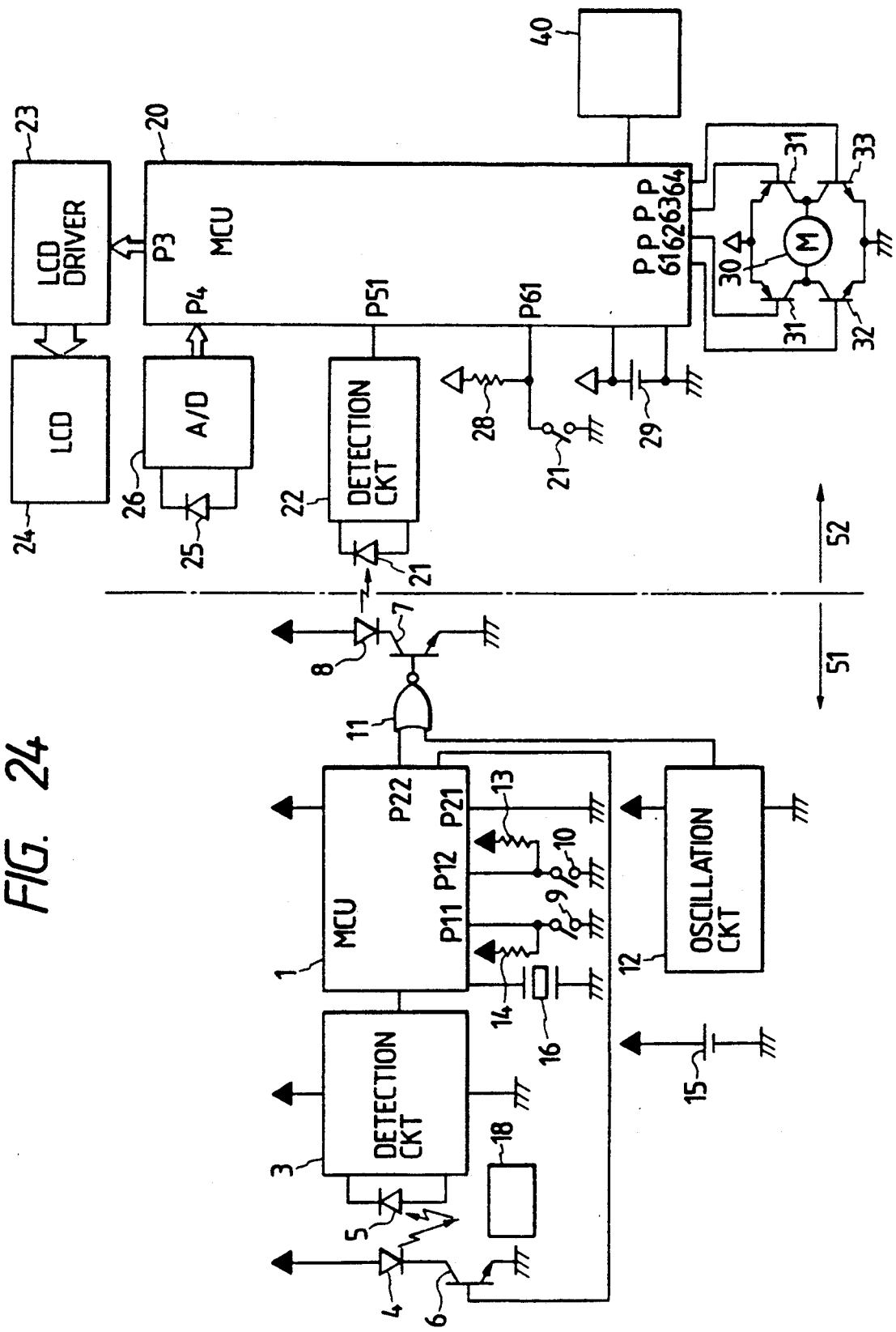
FIG. 24 is a block diagram showing a third embodiment of the present invention.

FIG. 24 shows a block diagram of a third embodiment of the present invention. A motor 30 is adapted to be driven by a bridge circuit comprised of transistors 31, 32, 33 and 34, and these transistors are similar to those in the block diagram of FIG. 1 in the other points than that they are controlled by the output ports P61, P62, P63 and P64 of the MCU 20, and perform similar operations.

The motor 30 is designed to operate the zoom construction (not shown) of the lens, and the MCU 20 displays the focal length information of the lens as previously described and at the same time, drives the motor 30 so that the focal length of the lens may coincide with the displayed value, thereby effecting zooming.

Accordingly, photographing at a focal length best suited for the photographing is automatically effected.

According to the present embodiment, a bar code list corresponding to an example of photograph at one to one and representative of the correspondence relation between codes representative of aperture information suitable for that photograph and lens focal length information necessary for the photographing, and the codes may be read therefrom to control the program chart of the camera and also display the information of the lens or the like necessary for photographing and therefore, the photographer can take photographs even if he has no knowledge or experience about photography. Also, these photographs and codes can be duplicated in a great quantity as by printing and the cost thereof can be correspondingly reduced.

These photographs also provide materials for teaching what expressions can be done by the use of such camera system and therefore, can also be used for that purpose.

(Modifications)

In the second and third embodiments, the transmission of data from the code reading apparatus 51 to the camera body 52 is done by infrared rays, but alternatively, it may be done by the wire system with the ports P22 and P51 directly connected together. In such case, the operability of reading will be reduced by the wire system, but the power sources, etc. can be made common and thus the cost can be reduced.

Also, in the second and third embodiments, bar codes are used as what represents the photographing data based on the examples of photographs, whereas the present invention is not restricted thereto, but any code may be used if it can correspond to a photograph at one to one and can be easily converted into an electrical signal. For example, use may be made of coded data written on a magnetic card recently used widely and having photographs printed on the surface thereof.

Also, photographs (or printed matters) have been shown as an example, but anything which could be visually perceived by the photographer will do. For example, if the images of examples of photographs are recorded as the images on a video tape and data similar to that of the above-described embodiments which has been modulated at a particular frequency is recorded on the sound portion of the video tape and the reading apparatus 51 is changed from the SPD to a microphone and the detection circuit 3 is made to correspond thereto, similar photographing can be accomplished by operating the reading apparatus 51 in the portion of an image to be photographed while watching the video tape by means of a video deck.

Further, on the code portions 18, there are recorded codes representative of the information set before photographing such as aperture information and shutter speed information and display codes representative of the information of the photographing machine parts to be used (depending on the lens focal length information), i.e., preparatory photographing information, but these are not restrictive. For example, as regards the information of the photographing machine parts in the preparatory photographing information, information meaning the use of a tripod and information meaning the use of a strobo device may be coded.

Figures 25, 26:
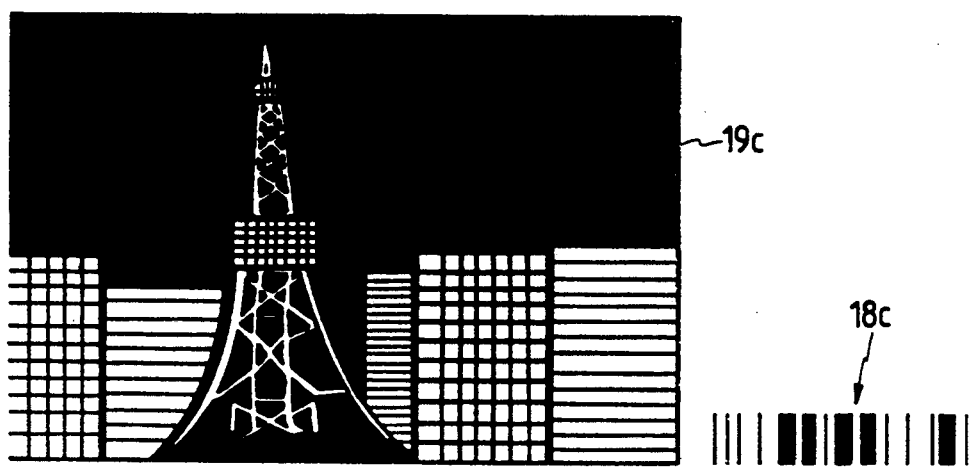
FIG. 25 illustrates an example of a photograph and a code portion.
FIG. 26 shows an example of the display on LCD shown in FIG. 24.

The photograph 19c of FIG. 25 is a photograph of a night view, and to take such a photograph, a tripod is indispensable to prevent camera shake. So, if a code indicative of the display of "TRIPOD" as shown in FIG. 26 is added to the bar code portion 18c, a display for calling upon the photographer to use a tipod will be done when the bar code is read by such a photograph.

Further, in the second and third embodiments, the information included in the code portion is the lens focal length information and the information of the photographing machine parts, but alternatively, it may be the name or the like indicative of the substance of the read bar code. For example, as shown in FIG. 27, if names are determined and design is made such that they are displayed, such a display as 301 in FIG. 28 will be effected if "30H" is included in the code. If the substance of this is printed simultaneously with the bar codes, it can be confirmed that the setting of data to the camera has been reliably effected.

The name in this case may be, for example, a numeral (a numeral indicative of the order of the bar code) or may be a combination of a name and a numeral. If in this case, the kinds of the bar codes are very many, it is not necessary to have a code table corresponding to all of them and therefore, a number of bar codes can be coped with without increasing the amount of data in the MCU 20.

Furthermore, in the second and third embodiments, the display of the information included in the code has been effected, but alternatively, the set state of the camera may be detected and display may be effected from the information thereof and the information included in the code.

That is, if the focal length (the actually set value) of the lens is read and that value is compared with the data included in the code and the display as shown in FIG. 29 is effected as a result, the user can be warned so as not to forget to set the optimum focal length of the lens. Herein, both of the detected focal length and the focal length included in the code are displayed, but alternatively, it may only be displayed that the two focal lengths differ from each other.

Such warning display may be effected not only of the focal length, but also of other information.

Figure 30:
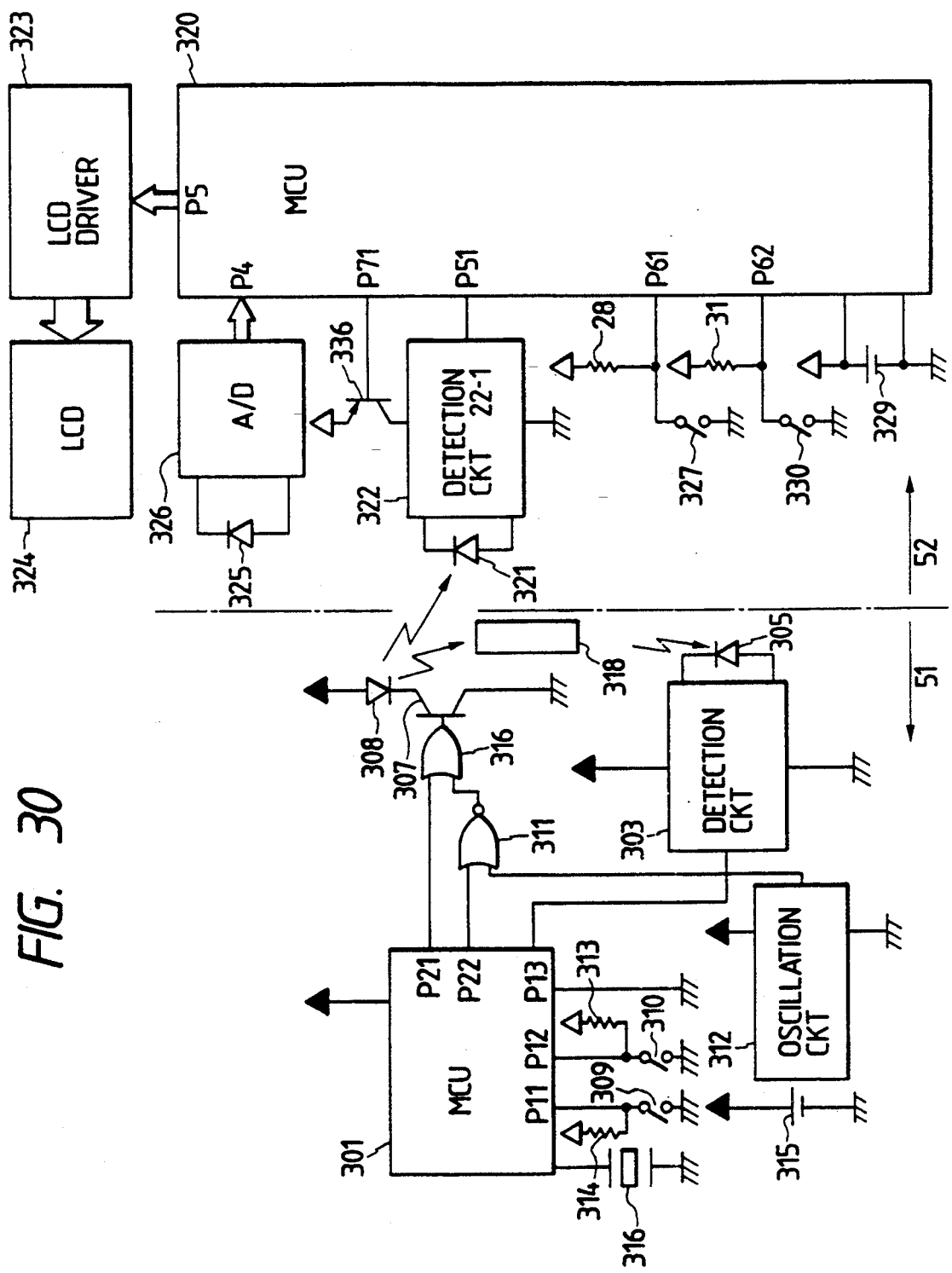
FIG. 30 is a block diagram showing a fourth embodiment of the present invention.

Referring now to FIG. 30 which is a block diagram showing a fourth embodiment of the present invention, the reference numeral 51 designates a code reading apparatus and the reference numeral 52 denotes a camera body.

On the code reading apparatus 51 side, the reference numeral 301 designates a 1-chip microcomputer (hereinafter referred to as the MCU) for effecting code reading control. The MCU 301 is comprised of a CPU, an ROM, an RAM, an IO, a serial communication interface (hereinafter referred to as the SCI) and a timer. Of the IO of the MCU 301, an input port P13 is connected to the output of a detection circuit for detecting codes, which circuit will be described later. Other input ports P11 and P12 are connected to switches 309 and 310, respectively, and these input ports are pulled up to a power source by resistors 313 and 314. The output port P21 of the IO of the MCU 301 is connected to one input of an OR circuit 316. The output port P22 of the SCI of the MCU 301 is connected to one input of a NOR circuit 311, and the other input of the NOR circuit 311 is connected to an oscillation circuit 312 of 38 KHZ, the output of which provides the other input of the OR circuit 316, and the output of the OR circuit 316 is connected to the base of a transistor which will be described later. Accordingly, the output from the output port P22 of the SCI may be put out as a signal modulated at 38 KHZ.

The reference numeral 305 designates a silicon photodiode (hereinafter referred to as the SPD) adapted to detect the reflected light of a code portion (hereinafter referred to as the bar code portion) 318 comprised of optically readable black bars and white spaces illuminated by a light emitted from an iRED 308. The reference numeral 303 denotes a detection circuit having therein an amplifying portion for amplifying the signal level. The detection circuit 303 may detect the output of the SPD 305 and output a low level if the detected output is that of the space portion of the bar code portion 318, and output a high level if the detected output is that of the bar portion of the bar code portion 318. The reference numeral 307 designates a transistor, the collector of which is connected to the iRED 308. The reference numeral 315 denotes a power supply battery for supplying a power source to the MCU 301, the detection circuit 303, the iRED 304 and the iRED 308. The reference numeral 317 designates a buzzer for indicating that code reading has been effected properly.

On the camera 52 side, the reference numeral 320 denotes an MCU for effecting the control of the camera. The MCU 320, like the MCU 301, is comprised of a CPU, an ROM, an RAM, an IO and an SCI. The reference numeral 321 designates an SPD designed to receive infrared light emitted from the iRED 308. The SPD 321 is connected to a detection circuit 322, which is adapted to output a low-level signal from an output port 22-1 only when there is a signal modulated at 38 KHZ. The power source of the detection circuit 322 is switched by a transistor 336, the base of which is connected to the output port P71 of the MCU 320. The output port 22-1 is connected to the input port P51 of the SCI of the MCU 320. The reference numeral 325 denotes an SPD for measuring the luminance of an object to be photographed. The SPD 325 is connected to an A/D converter 326 for converting the luminance of the object to be photographed into a digital value and outputting the digital value to P4 which is the input port of the IO of the MCU 320. The input port P4 is comprised of 8 bits. The reference numeral 324 designates a display LCD, and the reference numeral 323 denotes a driver for driving the LCD 324. The driver 323 is connected to the output port P3 of the IO of the MCU 320. The input ports P61 and P62 of the IO of the MCU 320 are connected to a switch 327 and a power source switch 330, and are pulled up to the power source by resistors 328 and 331. The reference numeral 329 designates the power supply battery of the camera 52 side. The power supply battery 329 supplies the power source to the MCU 320, the LCD driver 323, the A/D converter 326 and the detection circuit 322.

The SCI of the MCU 301 is adapted to output a non-synchronous type signal of 8 character length bits, 2 stop bits and 1 start bit, and the SCI of the MCU 320 is adapted to receive it as an input.

FIGS. 31 and 32 show the appearances of the code reading apparatus 51 and the camera body 52, and in these figures, members identical to those in FIG. 30 are given identical reference numerals.

The code reading apparatus 51 is provided with two switches 309 and 310, and the iRED 308 and SPD 305 which provide a code reading portion are incorporated in the tip end 338 of this apparatus. The iRED 308 is used also for the data transmission to the camera body 52 after code reading.

The camera body 52 is provided with a switch 327 for effecting photometry and a data receiving SPD 321.

Bar code portions 318a and 318b and photographs 319a and 319b corresponding thereto are printed on a bar code list 353, and bar code reading may be effected by the bar code portions 318 being traced by a bar code reading portion (the tip end 338).

The format of the bar code portions 318 will now be described.

The bar code of the bar code portions 318 is comprised of a thin line (which is called the narrow bar), a thick line (which is called the wide bar), a narrow spacing between the bars (which is called the narrow space) and a wide spacing between the bars (which is called the wide space), and "0" is made to correspond to the narrow bar and the narrow space, and "1" is made to correspond to the wide bar and the wide space. The ratio of width between the narrow space and the narrow bar is 1:1, and the ratio of width between the narrow bar and the wide bar is 1:3.

FIGS. 33 and 34 are cross-sectional views of the power source switch and the transmitted signal reading portion of the camera body 52.

In these figures, the reference numeral 321 designates the aforementioned SPD, and the reference numeral 335 denotes a rubber contact switch which is contacted by conductive rubber 332, 333 and 334 to thereby constitute the power source switch 330 shown in FIG. 30. The reference numeral 331 designates a key top for pushing the rubber contact switch 335. The key top 331 is hollow and has the SPD 321 incorporated therein. Further, the key top 331 is formed with an aperture for the lead portion 337 of the SPD 321.

Description will now be made of the operation when in the above-described construction, it is desired to express flowers beautifully.

The photograph 19a of FIG. 3 is an example of photograph when it is desired to express flowers beautifully, and the photograph 19b of FIG. 3 is an example of photograph when it is desired to record flowers. In the former, for example, the aperture is selected to F4 and the depth of field is made shallow to blur the background, whereby the beauty of the flowers is expressed, and in the latter, for example, the aperture is selected to F16 and the depth of field is made deep, whereby there is provided a photograph in which the background can be identified to a certain degree and the situation of photographing can be seen well.

In the case of this embodiment, the expression of flowers is the main purpose and thus, the photograph 19a (319a) is selected, that is, the reading of the bar code portion 18a (318a) corresponding to the photograph 19a (319a) is effected. To effect the reading of the bar code, the bar code portion 18a (318a) is traced while the switch 309 is depressed. When the switch 309 is depressed, the MCU 301 renders the output port P21 into a high level and therefore, the output of the OR circuit 316 also assumes a high level, and the transistor 307 is turned on and the iRED 308 is turned on.

At the same time, the MCU 301 effects the reading (already described) of the bar code. Here, the bar code portion 18a (318a) is expressive of "01" (decimal) and therefore, that value is read in and is once stored in the RAM in the MCU 301. When the switch 309 is opened, the MCU 301 renders P21 into a low level.

Description will now be made of a case where the data held in the internal RAM is transmitted to the camera body 52.

When the reading portion (the tip end 338) is urged against the light receiving portion 339 of the camera 52, as shown in FIG. 33, the key top 331 is pushed and the rubber contact switch 334 is closed, that is, the switch 330 shown in FIG. 30 is closed.

When the switch 330 is closed and the input port P62 assumes a low level, the MCU 320 outputs a low level to the output port P71 and turns on the transistor 336. By the transistor 336 being turned on, the power source is supplied to the detection circuit 322 and a state in which reception is possible is brought about.

When the switch 310 of the code reading apparatus 51 side is then depressed, the MCU 301 outputs from the SCI (the output port P22) binary data "00000001" resulting from "01" having been converted into BCD code.

According to the fourth embodiment; provision is made of the switch 330 adapted to be closed by the key top 331 in the light receiving portion 339 being pressed by the reading portion (the tip end 338) of the code reading apparatus 51 so that only during reception, said operation may be performed to close the power source switch of the detection circuit 322 for reception having an amplifier therein and therefore, the waste of the electric current can be avoided.

Also, it is unnecessary that the operation of the camera body 52 (such as the closing of the power source switch) be performed in advance, and this is preferable in the display and operation of the camera.

Further, transmission and reception are effected when the spacing between the transmitting portion and the receiving portion is constant, i.e., during the state of FIG. 34, and this leads to the effect that the quantity of light during the transmission can be reduced and correspondingly a battery of small current capacity can be used. This in turn leads to the effect that the influence of the outside light becomes small during transmission and reception and therefore malfunctioning can be reduced.

As described above, the fourth embodiment is provided with switch means adapted to be changed over from one state to the other state by being contacted by an outside information reading apparatus, power source switch closing means for closing the power source switch by detecting the change-over of the switch means to the other state, detecting means for detecting a transmitted signal from said information reading apparatus, display means for displaying preliminary photographing information which becomes necessary when the photographing operation is started, memory means storing therein the correspondence relation between said preliminary photographing information and the signal from said detecting means, and control means for selecting from said memory means the preliminary photographing information corresponding to the signal from said detecting means and causing said display means to display said preliminary photographing information, and is also provided with switch means adapted to be changed over from one state to the other state by being contacted by the outside information reading apparatus, power source switch closing means for closing the power source switch by detecting the change-over of said switch means to the other state, detecting means for detecting a transmitted signal from said information reading apparatus, memory means storing therein the correspondence relation between before-photographing set information used during the preliminary photographing operation before the photographing operation is started and the signal from said detecting means, and control means for selecting from said memory means the before-photographing set information corresponding to the signal from said detecting means and progressing the preliminary photographing operation on the basis of said before-photographing set information, whereby by being contacted by the information reading apparatus, the power source switch is closed on the camera side for the first time and in this state, the information from said information reading apparatus is detected by the detecting means and therefore, it becomes possible to provide a camera which does not uselessly waste the electric current and suffers little from malfunctioning and is good in operability.

What is claimed is:

1. An apparatus capable of communicating with an information reading and transmitting device wherein the information reading and transmitting device reads data, said apparatus comprising:
    (a) detecting means for detecting a light signal output from the information reading and transmitting device with a light signal detecting portion of said detecting means being provided with a switch, said switch having an actuator portion being configured to receive and align a proximal tip end portion of a light signal output portion of the information reading and transmitting device, said switch being adapted to change state while said actuator portion is contacted by the proximal tip end portion, said detecting means being enabled to perform the detecting operation by a change in the state of said switch; and
    (b) control means for controlling the operation of said apparatus on the basis of the result detected by said detecting means.

2. An apparatus according to claim 1, further comprising display means for displaying specific information on the basis of the result detected by said detecting means.

3. An apparatus according to claim 1, wherein the information reading and transmitting device operates with a battery contained therein as a power source.

4. An apparatus according to claim 1, wherein the information reading and transmitting device comprises bar code reading means for reading bar codes, and transmitting means for converting the bar code information read by said bar code reading means into a light signal and transmitting the light signal to said apparatus.

5. An apparatus, comprising:
    an information reading and transmitting device wherein said information reading and transmitting device reads data; and
    a controlled device in communication with said information reading and transmitting device, said controlled device comprising:
    (a) detecting means for detecting a light signal output from said information reading and transmitting device, with a light signal detecting portion of said detecting means being provided with a switch, said switch having an actuator portion being configured to receive and align a proximal tip end portion of a light signal output portion of said information reading and transmitting device, said switch being adapted to change state while said actuator portion is contacted by the proximal tip end portion, said detecting means being enabled to perform the detecting operation by a change in the state of said switch; and
    (b) control means for controlling the operation of said controlled device on the basis of the result detected by said detecting means.

6. An apparatus according to claim 5, wherein said information reading and transmitting device comprises bar code reading means for reading bar codes, and transmitting means for converting bar code information read by said bar code reading means into a light signal and transmitting the light signal to said apparatus.

7. An apparatus according to claim 5, further comprising display means for displaying specific information on the basis of the result detected by said detecting means.

8. An apparatus according to claim 5, wherein said information reading and transmitting device operates with a battery contained therein as a power source.

9. An apparatus for communicating with an information reading and transmitting device, the information reading and transmitting device including a light signal output portion for outputting an output light signal representative of information read by the information reading and transmitting device, said apparatus comprising:
    (a) detecting means for detecting the output light signal output from the light signal output portion, said detecting means comprising
        (i) a light signal detecting portion for detecting a light signal, said light signal detecting portion including a switch having an actuator portion being configured to receive and align a proximal tip end portion of the light signal output portion, said switch being configured to change state while said actuator portion is contacted by the proximal tip end portion, and (ii) means for enabling said detecting means to perform a detecting operation in accordance with a change in the state of said switch; and (b) control means for controlling operation of said apparatus on the basis of the output light signal detected by said detecting means.

10. An apparatus, comprising:

an information reading and transmitting device, said information reading and transmitting device including a light signal output portion for outputting an output light signal representative of information read by said information reading and transmitting device; and a controlled device in communication with said information reading and transmitting device, said controlled device comprising:

(a) detecting means for detecting the output light signal output from said light signal output portion, said detecting means comprising (i) a light signal detecting portion for detecting a light signal, said light signal detecting portion including a switch having an actuator portion being configured to receive and align a proximal tip end portion of said light signal output portion, said switch being configured to change state while said actuator portion is contacted by said proximal tip end portion, and (ii) means for enabling said detecting means to perform a detecting operation in accordance with a change in the state of said switch; and (b) control means for controlling operation of said controlled device on the basis of the output light signal detected by said detecting means.

* * * * *

UNITED STATES PATENT AND TRADEMARK OFFICE
CERTIFICATE OF CORRECTION

PATENT NO. : 5,446,518

DATED : August 29, 1995

INVENTOR(S) : Jiro Kazumi

It is certified that error appears in the above-indentified patent and that said Letters Patent is hereby corrected as shown below:

DRAWING SHEET 19 OF 21:

Fig. 28, "PORTPAIT" should read --PORTRAIT--.

COLUMN 2:

Line 68, "port." should read --port--.

COLUMN 10:

Line 58, "corresponding" should read --correspondingly--.

COLUMN 11:

Line 45, "tipod" should read --tripod--.

COLUMN 14:

Line 58, "embodiment;" should read --embodiment,--.

COLUMN 16:

Line 66, "comprising" should read --comprising:--.

UNITED STATES PATENT AND TRADEMARK OFFICE
CERTIFICATE OF CORRECTION

PATENT NO. : 5,446,518
DATED : August 29, 1995
INVENTOR(S) : Jiro Kazumi

It is certified that error appears in the above-indentified patent and that said Letters Patent is hereby corrected as shown below:

Column 18:
Line 6, "comprising" should read —comprising:—.

Signed and Sealed this

Fifth Day of December, 1995

Attest:

BRUCE LEHMAN

Attesting Officer         Commissioner of Patents and Trademarks